Jan. 21, 1969

P. H. WENDLAND

IMAGE TRANSDUCING SYSTEM EMPLOYING REVERSE BIASED JUNCTION DIODES 3,423,623

Filed Sept. 21, 1966

INVENTOR.
PAUL H. WENDLAND,
BY
Thomas R. Boston
ATTORNEY.

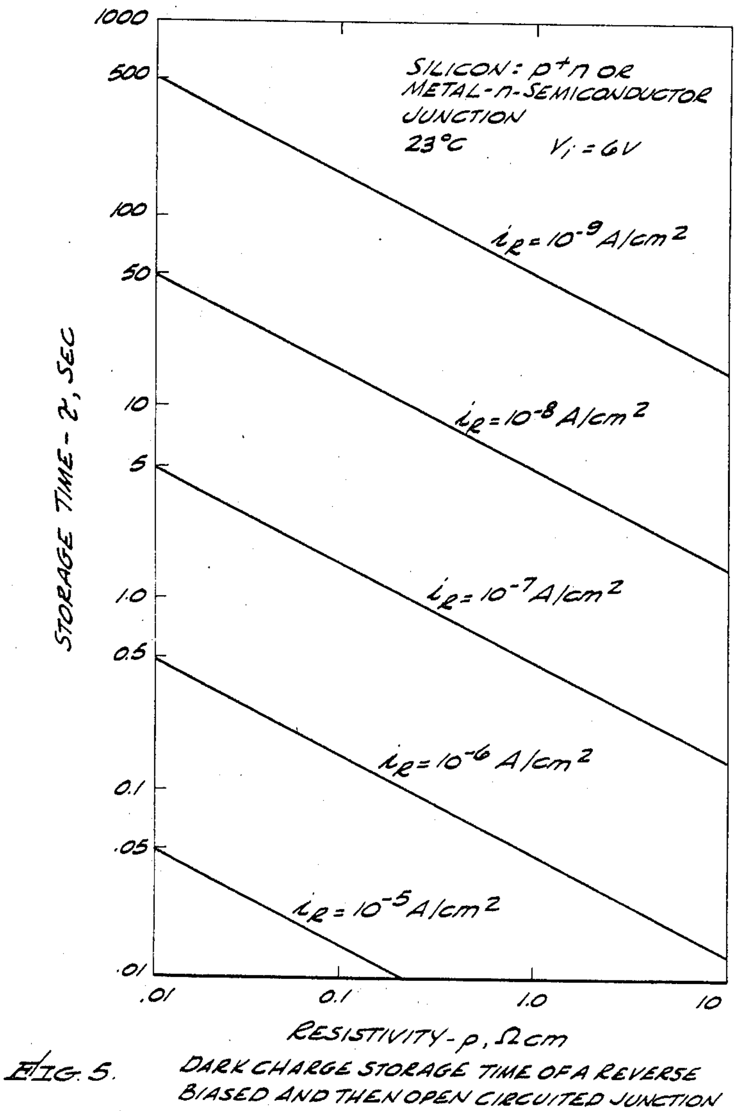
FIG. 5. DARK CHARGE STORAGE TIME OF A REVERSE BIASED AND THEN OPEN CIRCUITED JUNCTION AS A FUNCTION OF BASE RESISTIVITY WITH REVERSE LEAKAGE CURRENT AS A PARAMETER

CHARGE STORAGE TEST ARRANGEMENT

United States Patent Office 3,423,623

Patented Jan. 21, 1969

3,423,623

IMAGE TRANSDUCING SYSTEM EMPLOYING REVERSE BIASED JUNCTION DIODES

Paul H. Wendland, Malibu, Calif., assignor to Hughes Aircraft Company, Culver City, Calif., a corporation of Delaware

Filed Sept. 21, 1966, Ser. No. 580,962

U.S. Cl. 315—10 22 Claims

Int. Cl. H01j *29/39, 31/26*

ABSTRACT OF THE DISCLOSURE

A target for a vidicon camera tube comprising an N-type semiconductor member having a resistivity between 0.01 and 0.1 ohm-cm. and a plurality of discrete junctions on the side of the target member which is to be scanned by an electron beam.

Figure 1:
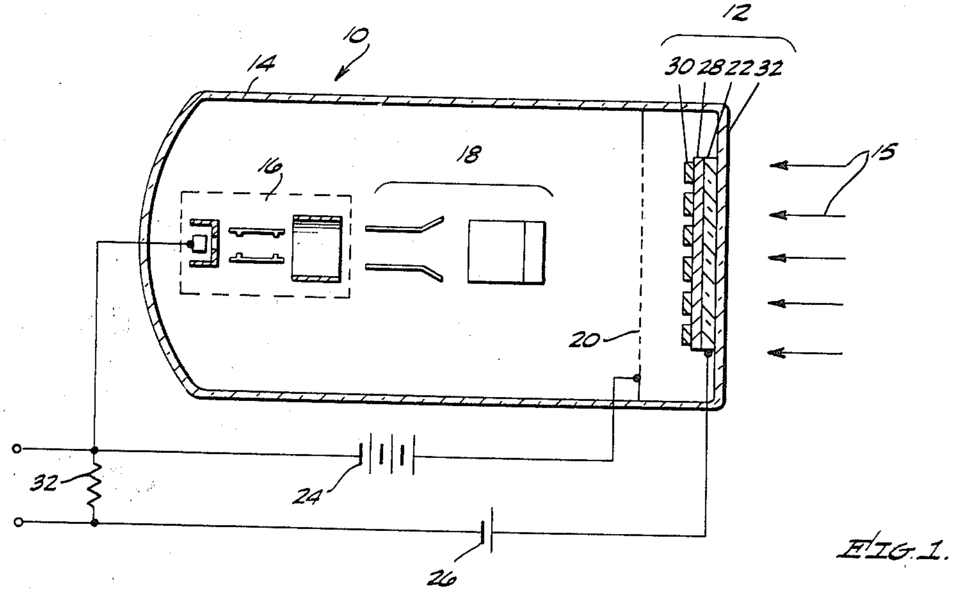

This invention relates generally to image transducing systems employing photosensitive, charge-storing elements and more particularly to an improved vidicon camera tube and target element for use therein.

The vidicon is a well-known television camera tube which has come into wide use since its introduction. The vidicon employs the phenomenon of photoconductivity in the target element to transduce light signals into electrical signals. The relaxation time of the photoconductor must be greater than the 1/30 of a second television raster scan time in order for the scanning readout electron beam to be able to distinguish between the illuminated and the dark areas of the target. The requirements of the vidicon target are thus basically twofold; photosensitivity with high quantum efficiency, and a charge storage time greater than 1/30 of a second. In addition, a fast time response at all light levels is desired, and for special applications, a spectral response with high quantum efficiency in a variety of regions such as the infrared, the visible, and/or the ultraviolet.

The target materials successfully used to date for vidicon operation are compound semi-insulators with relatively large bandgaps and with resistivities above the $10^{11}$ ohm-cm. necessary to exhibit RC relaxation times greater than 1/30 of a second. Antimony trisulfide (the most common vidicon target material) exhibits an effective peak quantum efficiency of 7%, a spectral response from 4000 A. to 7000 A., and a "time lag" at low light levels. Narrower bandgap materials having more desirable characteristics (e.g. higher quantum efficiency and larger range of spectral response) than antimony trisulfide for use as vidicon target materials, exhibit too low a resistivity for bulk photoconductor vidicon operation.

It is a primary object of the present invention to provide a vidicon camera tube having increased sensitivity, faster response time, and a wider spectral response.

It is another object of the invention to provide a vidicon camera tube target element which will provide the above-mentioned improvements.

It is a further object of the invention to provide a method of employing narrow bandgap materials (which exhibit too low a resistivity for bulk photoconductor vidicon operation) as the target material for vidicon camera tubes.

It is a still further object of the invention to provide a vidicon target comprising a matrix or array of discrete diode junctions in silicon or germanium.

These objects are accomplished according to the present invention by means of a unique target by means of which charge relaxation times greater than 1/30 of a second (a typical television scan time) are achieved in relatively low resistivity materials. This target comprises a layered structure formed of a single semiconductor material having a $p^+n$ junction between a large area n-type layer and a p-type layer formed as a mosaic array of discrete, insulatingly spaced-apart small area islands. The p-type layer faces the scanning electron beam and is charged to the cathode potential. A transparent conductive electrode in contact with the other surface of the n-type layer has applied thereto a positive potential to reverse bias the $p^+n$ junction. Such a target constructed of silicon having a resistivity between 0.01 and 0.1 ohm-cm. exhibits a charge relaxation time greater than the 1/30 of a second television scan time. Any photosensitive semiconductors having a resistivity satisfying the following formula can be used:

$$\left(\frac{1}{F_0^{\mathrm{i}}}\right)^2\left(\frac{2V_{\mathrm{i}}}{\epsilon\epsilon_0\mu_{\mathrm{n}}}\right)<\rho<\left(\frac{30}{i_{\mathrm{R}}}\right)^2\cdot\left(\frac{\epsilon\epsilon_0V_{\mathrm{i}}}{2\mu_{\mathrm{n}}}\right)$$

wherein $F_0^i$=Zener breakdown electric field strength,
$V_i$=target potential (up to 10 v.),
$\mu_n$=electron mobility of the n-type layer,
$\epsilon$=dielectric constant of n-type layer,
$\epsilon_0$=dielectric constant of p-type layer,
$i_R$=reverse bias saturation current.

By means of this design the performance and improvements specified above are achieved. For example, reverse biased $p^+n$ junctions in silicon have demonstrated peak quantum efficiencies for photoconductivity of 35%, a spectral response from 3500 A. to 11,000 A., and a response time of microseconds. It was not known, prior to the present invention, that a target structure could exist which could satisfy the requirements for vidicon charge storage in relatively low resistivity semiconductors. Advantageously, even high resistivity semiconductors like antimony trisulfide can be used since it is possible by proper doping to obtain low resistivity from high resistivity materials.

Previous vidicon camera tubes were too insensitive and too slow at low light levels to be used extensively in commercial television. A vidicon camera tube made according to the present invention, however, provides performance equal to that of the image orthicon camera tube while providing lower price and longer service. The present invention can also be used as an image transducing device having applications in the infrared. The target of the present invention, with a response out to 1.1 microns, can fulfill the need for an image transducing device useful at night, since it is noted that a substantial portion of the illumination of the night sky is located at 1.0 micron.

Figure 2:
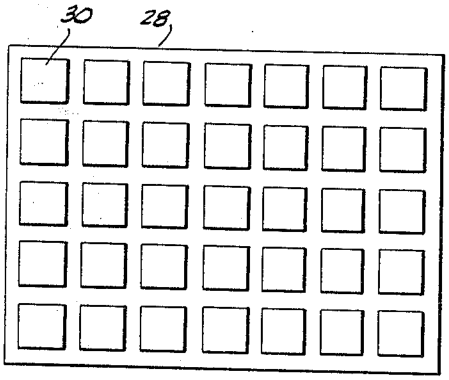
Figure 3:
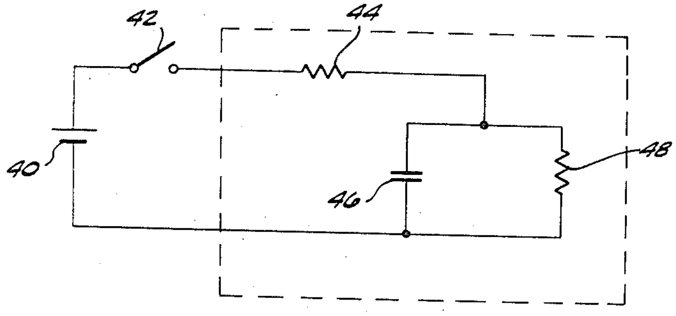
Figure 4:
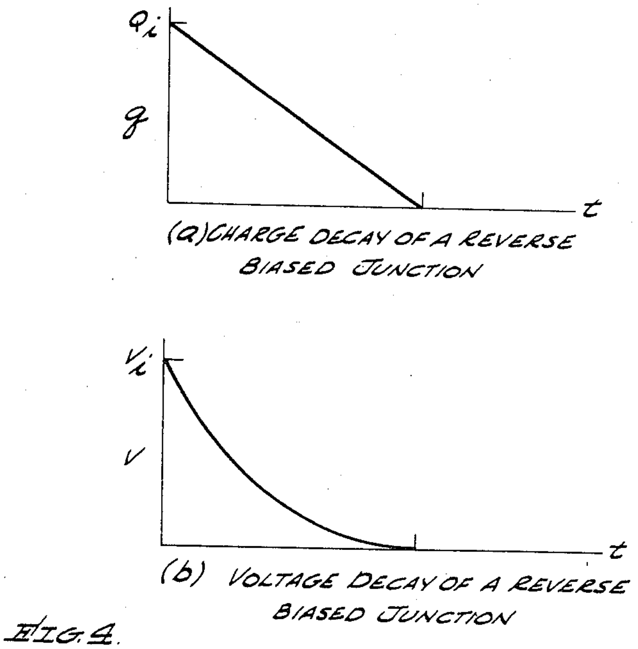
Figure 8:
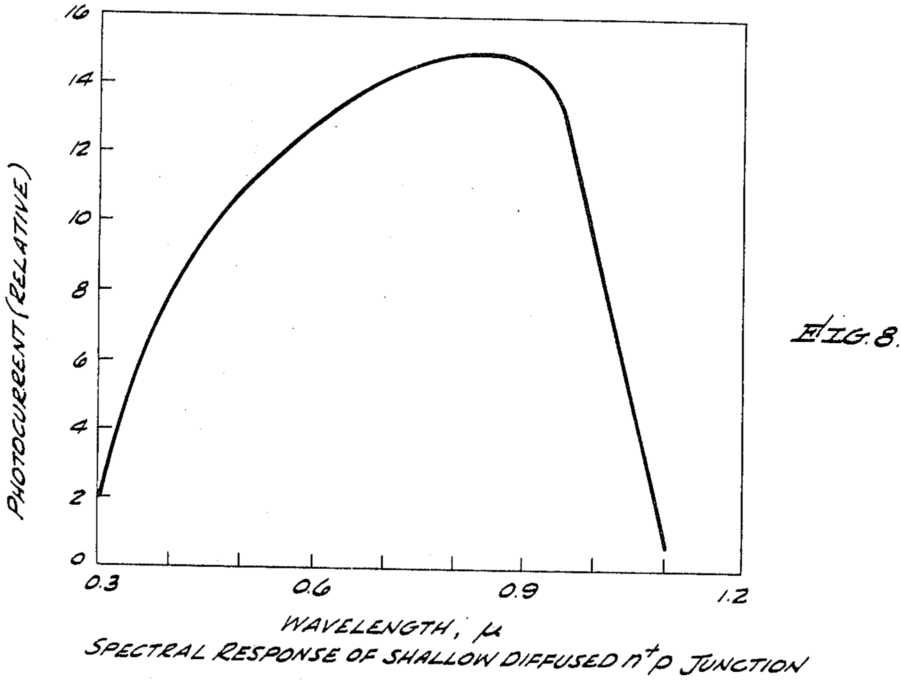
Figure 6:
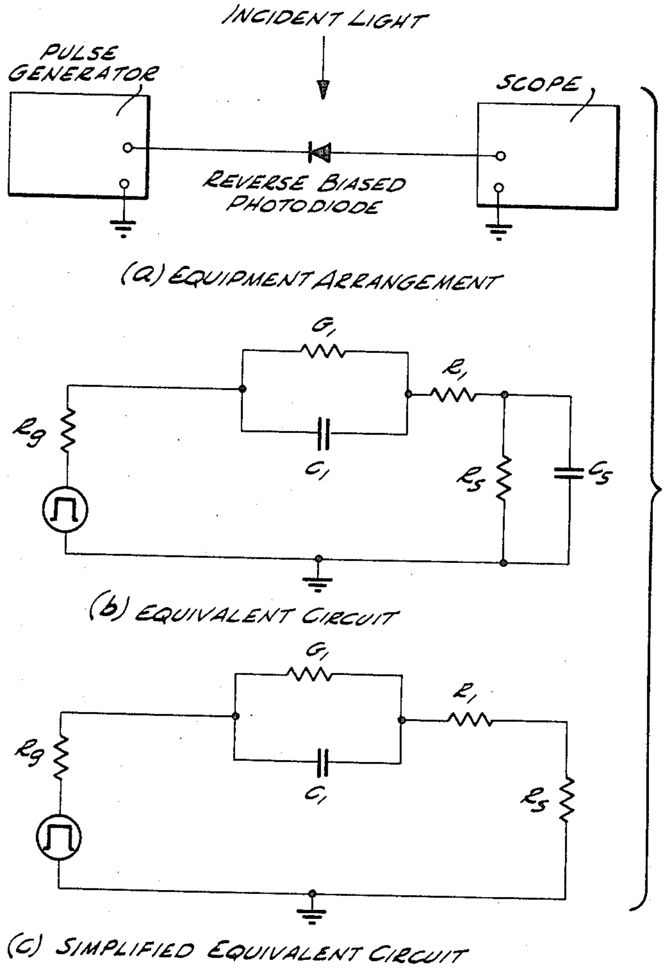
Figure 9:
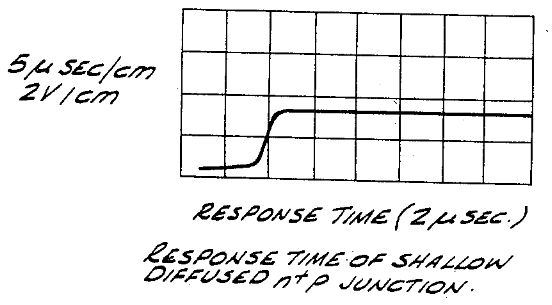

These and other objects and advantages of the present invention will be more fully understood by reference to the following detailed description when read in conjunction with the attached drawings wherein like reference numerals indicate like elements and in which:

FIG. 1 is a cross-sectional, partly schematic view through a vidicon camera tube of the present invention, FIG. 2 is a front view of the target of FIG. 1 and shows the mosaic array of p-n junctions, according to the invention, FIG. 3 is a schematic diagram of an equivalent circuit of a reverse biased junction diode, FIGS. 4A and 4B are graphs showing the charge decay and voltage decay, respectively, of a reverse biased junction diode, FIG. 5 plots dark charge storage time vs. base resistivity with reverse leakage current as a parameter, FIGS. 6A, 6B and 6C schematically illustrate the charge storage test arrangement employed, with FIG. 6A showing the equipment arrangement, FIG. 6B showing an equivalent circuit, and FIG. 6C showing a simplified equivalent circuit, FIGS. 7A–7E illustrate various charge storage times obtained with the test setup shown in FIG. 6, FIG. 8 is a graph showing the spectral response of a shallow diffused $n^+p$ junction, and FIG. 9 is a graph showing the response time of shallow diffused $n^+p$ junctions.

The invention will now be described in detail by reference to a preferred embodiment thereof which employs silicon as the target material. FIG. 1 illustrates a vidicon camera tube 10 of essentially standard construction with the exception of the target 12 which employs the unique design of a mosaic array of reverse biased junction diodes according to the present invention. The tube 10 comprises an evacuated envelope 14 within which the target 12 is positioned at one end so as to be exposed to a radiation image (indicated by the arrows 15). At the opposite end of the tube 10 is positioned an electron beam forming and scanning system. Such systems are well-known, form no part of the present invention, and need not be described in detail here. Briefly, the beam-forming and scanning system is of conventional design and operation and includes an electron gun assembly 16 and deflection means 18 whereby an electron beam can be formed and deflected to scan the target 12 in a predetermined and well-known manner. Positioned adjacent the target 12 is an electrode mesh 20 for collecting secondary electrons, as is well-known in the art. Electrical leads are shown for connecting the cathode of the gun assembly 16, the collecting mesh 20, and the transparent front electrode 22 of the target 12, to suitable voltage sources 24 and 26 as is well-known.

The target 12, made according to the present invention, includes a glass faceplate 32, which in the embodiment shown in FIG. 1, consists of one end wall of the envelope 14, although it can be a separate element. Positioned in contact with the faceplate 32 is a silicon base wafer 28 having a transparent film of conductive material coated on that surface of the silicon wafer 28 which is in contact with the faceplate 32, said film forms the front electrode 22. The other surface of the silicon wafer 28 is provided with a layer 30 which comprises a mosaic or array of discrete dots or small area islands. The silicon wafer 28 is an n-type single crystal silicon wafer of resistivity between 0.01 and 0.1 ohm-cm. An oxide layer is grown over one face or surface of the wafer 28 by thermal processing in steam. A photo-resist process is used to form an array of holes in the oxide layer corresponding to the desired resolution (e.g. 500 lines/in. for television use). The wafer 28 is then placed in a diffusion furnace and a p-type impurity is thermally diffused through the holes in the oxide layer to form an array of discrete n-p junctions. The transparent conductive front electrode 22 is then formed on the opposite face or surface of the wafer 28 through another thermal diffusion (which produces an ohmic junction). After this construction is completed the wafer is ready to mount in the vidicon tube 10 in contact with the glass faceplate 32.

FIG. 2 is a front view of a target according to the invention, such as that shown in FIG. 1, and shows a mosaic array of p-n junctions formed by discrete islands of layer 30 on base wafer 28.

The electron beam coming from the cathode of the gun assembly 16 is accelerated to a few kilovolts at the mesh 20, by the potential applied therebetween from the voltage source 24. This high velocity electron beam will travel through the openings in the mesh 20 and be decelerated toward the potential at the surface of the target 12. In a short time this surface will become charged to the potential of the cathode. A small potential is applied from the voltage source 26 between the target electrode 22 and the cathode of the gun assembly 16. This potential appears across the elements of the target 12 that are struck by the electron beam, since the charged surface of the target 12 is insulated from the front electrode 22 by the resistance of the body of the target material. If the beam scans every element of the target 12 in some sequential fashion, the whole target 12 will experience this applied potential across its thickness if the time taken to scan the surface is less than the dielectric relaxation time of the material of the target 12. Otherwise, the part of the target 12 that was scanned first would lose its charge before the last part of the target 12 is scanned. Since a typical television scan time is $1/30$ of a second, the requirement on the vidicon target material, for successful television operation is that the charge relaxation time be greater than $1/30$ of a second, for no incident illumination.

In the operation of known vidicon camera tubes using, e.g. antimony trisulfide, a light pattern is focused on the vidicon target through the front transparent electrode and the elements of the target that are struck by light lose their charge since the target material is photoconductive. This occurs because the light-induced electron-hole pairs reduce the resistance of the target body and thereby decrease the RC relaxation time. When the scanning electron beam returns to an element that has been discharged by light during the previous scanning cycle, it quickly charges this element back up to cathode potential. In so doing a current flows in the external circuit (through the resistor 32 of FIG. 1), and it is this current which provides the television signal indicating the presence of light at that particular point on the target. The electron beam charges an element in microseconds, as it continuously moves over all of the screen elements in succession, but each element has $1/30$ of a second to be discharged by incoming light. This gives the vidicon a $1/30$ of a second integration feature which is very important in building up detectable signals at low light levels. Without this integration feature, the vidicon could not compete with the Image Orthicon, which uses secondary emission multiplication to amplify light-induced signals up to one million times.

Referring back now to the present invention and the operation of the vidicon camera tube of FIG. 1, the charge storage mechanism of target 12 is somewhat different from that of known vidicon camera tubes described above. The achievement of charge relaxation times greater than $1/30$ of a second, in relatively low resistivity materials and its application to vidicon targets is the essential feature of this invention. In order to understand the mechanism for this, consider the n-p junction structure of FIG. 1.

In considering such a junction (either p-n or metal-semiconductor) as a target element of a vidicon, it is important to recall that the electron beam successively charges each element to a predetermined potential. It is essential to know how long a voltage and its corresponding dielectric charge remain on a reverse biased junction once the source of charge has been open circuited from the element (corresponding to the electron beam moving on to an adjacent but isolated p-n junction element). FIG. 3 shows the equivalent circuit for such a reverse biased element, and includes a voltage source 40, a switch 42, a resistor 44, and a capacitor 46 and resistor 48 in parallel. According to semiconductor theory, the reverse biased junction behaves as a parallel plate capacitor whose plate separation is given by the depletion depth *d*. This depth is a function of applied reverse voltage and various material parameters, chiefly the base layer doping. When an applied reverse bias voltage is removed, the junction acts as if it were a charged capacitor of plate separation *d*. The charge does not collapse instantaneously but decays through the junction leakage currents, i.e., reverse saturation current and edge leakage current. For calculation purposes a reverse biased and then open circuited p-n junction capacitor being discharged through its own leakage current was used. Since the reverse saturation current is ideally constant, independent of junction voltage or charge, the general expression $dq/dt=i_R$, integrates out to $(q-Q_i)=i_Rt$. This relationship is plotted in FIG. 4A. FIG. 4B shows the change of voltage with time across such a junction, according to the results derived below.

Consider an ideal p-n junction which has been reverse biased to some voltage $V_i$ corresponding to some charge $Q_i$; the junction is then instantaneously open circuited. We determine the decay of charge and voltage across the junction as follows. The change of charge with time is simply given by $$dq/dt-i_R \quad (1)$$

wherein $i_R$ is a constant, and $q=Q_i$ at $t=0$. Thus (1) integrates to $$q-Q_i=i_Rt \quad (2)$$

and is plotted in FIG. 3A. The charge $q$ is related to the applied junction voltage through the capacitance C, which is itself voltage dependent $$C=\alpha V^{-1/2} \quad (3)$$

where $\alpha$ represents material constants, and the built-in voltage is assumed small compared with V. Substituting $q=CV$ in (1), $$\alpha\left(\frac{dV^{-1/2}}{dt}\right)=i_R \quad (4)$$

Integrating (4) with the initial condition that $V=V_i$ at $t=0$, $$V-V_i=\beta^2t^2+2\beta tV_i \quad (5)$$

where $\beta$ $$(\text{constant})=i_R/\alpha$$

The relation between the initial charge on the junction $Q_i$, and the initially applied voltage $V_i$ is $$Q_i=C_iV_i \quad (10)$$

where $i$ refers to initial state. The decay time or current flow time $\tau$ of this initial total charge is given by $$\tau=Q_i/i_RA \quad (20)$$

where $i_R$ is the constant total reverse leakage current per unit area. From semiconductor theory, for a reverse biased junction, $$C_i=\epsilon\epsilon_0A/d \quad (30)$$

where $d$ is the depletion depth, A is the area, and $\epsilon$ is the dielectric constant. Substituting (10) and (30) in (20), $$\tau=\epsilon\epsilon_0V_i/i_Rd \quad (40)$$

Clearly, for long charge decay times, the leakage current and depletion depth must both be as small as possible. For either a $p^+n$ or metal-n-type semiconductor, the depletion depth is dependent on the applied voltage and base resistivity in the following manner.

$$d=[2\epsilon\epsilon_0(V_d+V_i)/eN_d]^{1/2} \quad (50)$$

where $V_d$ is the diffusion potential of the barrier layer, $V_i$ is the applied potential, $e$ is the electron charge, and $N_d$ is the donor density of the N type base wafer. Substituting (50) into (40) with the assumption of a step junction, $V_i>V_d$, and $N_d=1\rho e\mu_n$, $$\tau=\left(\frac{1}{i_R}\right)\cdot\left(\frac{\epsilon\epsilon_0V_i}{2\mu_n\rho}\right)^{1/2} \quad (60)$$

(junction open-circuited charge decay-time)

where $\rho$ is the resistivity of the n-type base wafer, and $\mu_n$ is the electron mobility of the n-type side. For long charge decay times, the reverse leakage current and base resistivity must both be as low as possible.

Equation 60 should be contrasted with the charge decay time for vidicon operation with bulk photoconductors $$\tau=\epsilon\epsilon_0\rho \quad (70)$$

(bulk photoconductor charge decay time)

It is important to note that high resistivity is required for vidicon operation with bulk photoconductors, while low resistivity is necessary for the bulk material used to make junctions. Since it is almost always possible by proper doping to obtain low resistivity from high resistivity material (but not the converse), a wide range of materials may be adoptable to junction structures for use on vidicon targets. Infrared responsive charge storage vidicons, for example, are not possible with bulk photoconductive targets at room temperature since a small bandgap (i.e., less than 1.1 ev.) is implicit, and the intrinsic resistivities of $10^{11}$ ohm-cm. required for vidicon operation are not obtainable in materials with bandgaps less than about 1.7 ev. at room temperature.

Equation 60 shows that the charge storage time in the open circuited junction increases in proportion to the one-half power of the reciprocal of the base resistivity. However, the base resistivity cannot be chosen to have an indiscriminately low value to achieve the longest charge storage time. The Zener breakdown electric field strength sets a lower limit on the useful base resistivity. The maximum electric field strength $F_0=2V_i/d$, at a step junction interface is related to the applied bias voltage and the base resistivity in the following manner:

$$F_0=(2V_i\epsilon\epsilon_0\rho\mu_n)^{1/2} \quad (80)$$

The electric field strength, $F_0^i$ at which Zener breakdown begins must not be exceeded in normal device operation. Since the vidicon target potential, $V_i$, is typically 10 v. or less, Equation 80 sets a lower limit on the useful base resistivity:

$$\rho>\left(\frac{1}{F_0^i}\right)^2\cdot\left(\frac{20}{\epsilon\epsilon_0\mu_n}\right)\ (\text{for } V_i=10 \text{ volts}) \quad (90)$$

Since the charge decay time for normal vidicon operation must be greater than 1/30 of a second, Equation 60 with $\tau=1/30$ of a second, sets an upper limit on base resistivity. Equations 60 and 90 together define a range of base resistivity in which junctions can be used as charge storage vidicon targets $$\left(\frac{1}{F_0^i}\right)^2\cdot\left(\frac{2V_i}{\epsilon\epsilon_0\mu_n}\right)<\rho<\left(\frac{30}{i_R}\right)^2\cdot\left(\frac{\epsilon\epsilon_0V_i}{2\mu_n}\right) \quad (100)$$

(basic junction charge storage criterion)

Any photosensitive material in which a junction can be obtained which satisfies (100) can be used as a charge storage vidicon target, with a dark state charge storage time of at least 1/30 of a second. Materials with junctions which cannot satisfy (100) will show dark charge storage times of less than 1/30 of a second or Zener breakdown.

The parameters in Equation 100 are well known for silicon, and this material can be readily evaluated for junction charge storage vidicon operation at room temperature. The Zener breakdown electric field strength $F_0^i$ in silicon is approximately $10^6$ v./cm. Since vidicon operation requires a target potential $V_i$ up to 10 v., the left side of (100) sets a lower limit on the base resistivity, $\rho<1.6\times10^{-2}$ ohm-cm. In order to evaluate the right side of (100), the reverse bias saturation current $i_R$ must be known. This quantity can be readily calculated from well known equations if the doping density and lifetime of the base material are known. We have consistently obtained experimental values less than $10^{-6}$ A./cm.$^2$ in a junction mesa construction, and this value seems a reasonable upper limit for good planar technique as well. Assuming a reverse saturation current of $10^{-6}$ A./cm.$^2$, and $V_i=10$ v., (100) predicts that for silicon junctions to exhibit reverse biased dark state charge storage times greater than $\frac{1}{30}$ of a second, the following criterion must be obeyed: $1.6\times10^{-2}$ ohm-cm.$<\rho<4$ ohm-cm. (for charge storage diode vidicon operation in silicon junctions exhibiting reverse currents of $10^{-6}$ A./cm.$^2$). It is evident, therefore, that state of the art silicon step junctions can be constructed which satisfy the requirement for charge storage vidicon operation at room temperature. As the resistivity $\rho$ of the lightly doped n-side approaches $10^{-2}$ ohm-cm., the charge storage time increases; all junctions with resistivities below 4 ohm-cm. and reverse leakage current less than $10^{-6}$ A./cm.$^2$ will yield at least $\frac{1}{30}$ of a second charge storage. FIG. 5 plots charge storage time vs. resistivity $\rho$ with $i_R$ as a parameter, from (60).

The requirements for charge storage vidicon operation at room temperature in germanium junctions are more stringent because of the greater reverse leakage current. The breakdown electric field strength in germanium is approximately $10^5$ v./cm., and the left side of (100) thus sets a lower limit on the base material resistivity for 10 v. target potential operation, $\rho>10^{-1}$ ohm-cm. The depletion depth for a step junction in germanium constructed from $10^{-1}$ ohm-cm. base material with 10 v. bias is, from (50) approximately $1\mu$. The capacitance of such a device is thus $1.4\times10^{-8}$ f./cm.$^2$. From (20), if the charge decay time is to be longer than $\frac{1}{30}$ of a second, the reverse leakage current must be less than $$i_R<10^{-5}\text{ A./cm.}^2 \qquad (130)$$

The predictions of this theory have been checked with some large area experimental diode structures in silicon. These diodes were constructed using mesa diffusion technology, and reverse biased charge storage times were measured in a pulse setup.

The theory of the previous section was carried out specifically for p+n structures, since it will be shown in the following section that electron beam charging processes require this structure rather than an n+p. The charge decay processes, however, are the same in both structures and the theory is changed only by substituting "p" for "n." The experimental work, described below, was carried out on n+p diodes for convenience.

It is noted here that the charge-storing, photo-sensitive, image transducing structure of this invention need not always be a p+n structure since the mosaic array surface can be charged positively. In the case in which the mosaic surface is charged positively an n+p structure is used in order to properly obtain reverse biasing. Such positive charging can be accomplished, e.g., by corona charging or positive ion beam scanning.

Several 10 mil thick wafers of 0.1 ohm-cm. p-type silicon were placed in a phosphorous vapor stream at 950° C. for 30 minutes to form a sub-micron thick $n^+$-type surface inversion layer. One side was etched away to produce a wafer thickness of 8 mils with a phosphate glass on one face only. The wafers were than placed in a boron vapor stream at 900° C. for 15 minutes to form a $p^+$ contact on the previously etched wafer face. A 1 cm.$^2$ mesa was etched in both surfaces to form an $n^+$-p-$p^+$ structure. Identical operations were performed on 1000 ohm-cm. p-type wafers. We have thus constructed several $n^+$-p-$p^+$ step diodes on low resistivity base material (which fulfills the theoretical criterion for long charge relaxation times), and have constructed several identical diodes on high resistivity base material (which does not fulfill this criterion).

Capacitance versus voltage plots were taken to check the value of depletion depth. The measured parameters for the two sets of diodes are given in Table I. The slight differences between theoretically calculated depletion depths and experimentally measured values are ascribed to changes in base wafer resistivity during the diffusion cycle.

TABLE I.—EXPERIMENTAL DIODE PARAMETERS

| Base material | Junction type | Depletion depth, (6 v. reverse bias) | Saturation current A./cm.$^2$ (6 v. reverse bias) | RC, msec. (open circuit decay) |
|---|---|---|---|---|
| (A) 1,000 p-cm p-type silicon. | n+p Phosphorous diffused mesa. | 30 | $10^{-6}$ | 1 |
| (B) 0.1 p-cm p-type silicon. | -----do---------- | 0.1 | $2\times10^{-7}$ | >50 |

Figure 7:
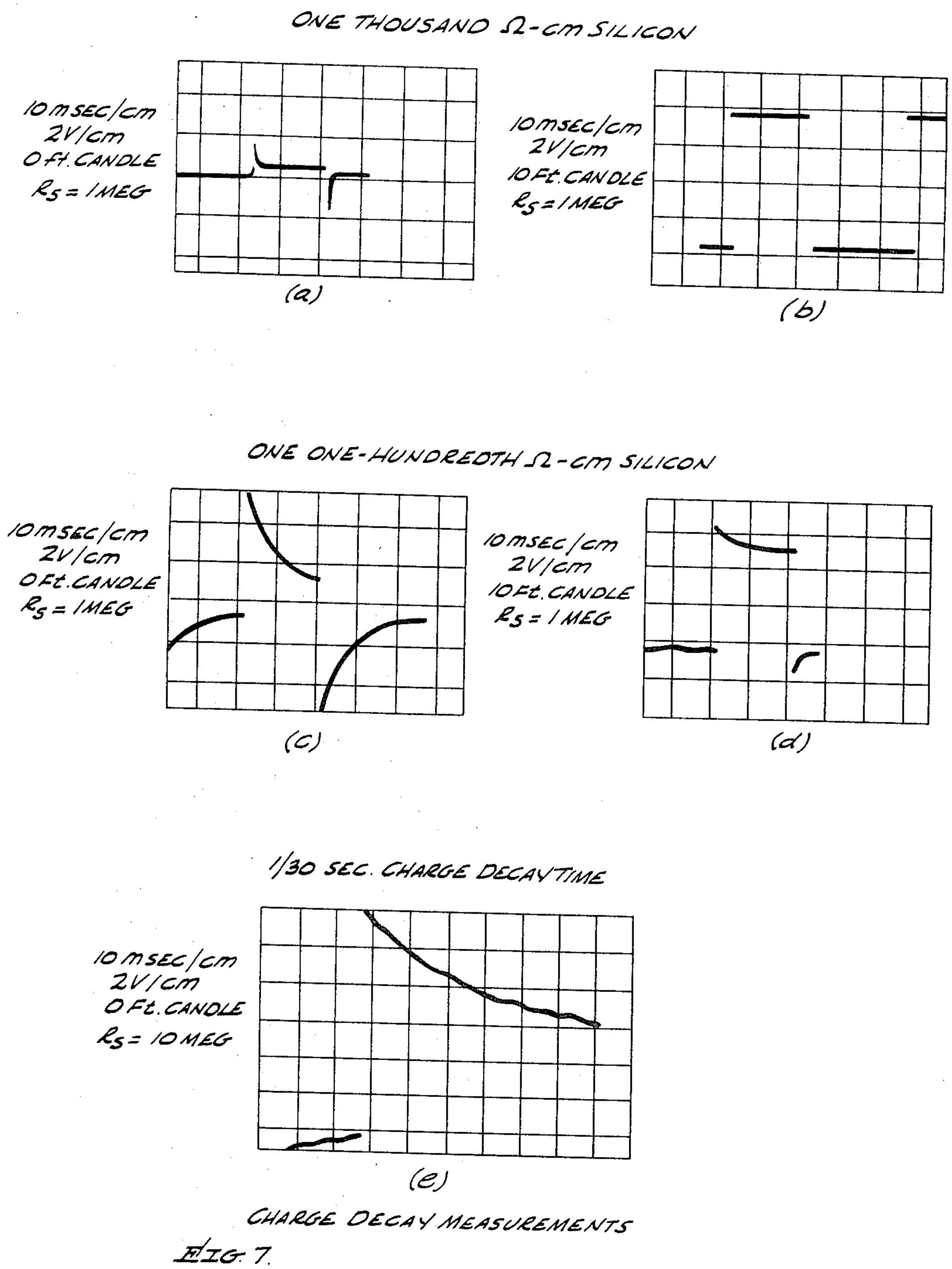

These diodes were tested for reverse biased charge storage. FIG. 7 shows that the RC charge storage time of the 0.01 ohm-cm. silicon base junction is at least $\frac{1}{30}$ of a second and that the high resistivity base silicon (1000 ohm-cm.) does not give an RC product which even approaches the $\frac{1}{30}$ of a second desired for true vidicon operation.

For successful use as vidicon targets, a silicon junction must show efficient photoconductive properties and fast time responses to changing light levels, as well as charge storage. The spectral response curve for one of the charge storage junctions is given in FIG. 8; the response time to a pulse from a gallium arsenide light emitting diode is shown in FIG. 9. Wide spectral operating range and relatively fast response time characteristics are well known for shallow junctions. However, these data demonstrate that such characteristics can be obtained simultaneously with long charge storage phenomena in low resistivity base material according to the present invention. The quantum efficiency of this device has also been measured. A calibrated thermocouple detector was used to determine the light power incident on the diode from a 2500° K. tungsten lamp, and the induced photocurrent was measured. A value of 0.30 $\mu$A./$\mu$w. was obtained for a quantum efficiency of 35% for $1\mu$ radiation. Such junctions have also been tested under vacuum conditions, and they show improved reverse leakage current characteristics in vacuum, rather than any degradation.

In order to maintain an image on a vidicon target, it is necessary that the lateral resistance be high enough to isolate individual elements, so that the illuminated elements of the image do not spread. A single silicon junction obviously will not satisfy this requirement since the lateral resistance in all cases is quite low; however, an array of small individual junctions could satisfy the requirement. Isolation would be attained through the reverse biasing of the junctions in a typical vidicon scan operation. In order to attain a 500 line television resolution, individual elements with dimensions of about 0.0015 by 0.0015 in. must be formed, with an interelement separation of 0.0005 in. Since it is not necessary for leads to be attached to the individual elements, the problem is less complex than that for processing monolithic integrated circuitry. These elements can be constructed using photolithography and KPR techniques.

With reference to the target 12 of FIG. 1, the incoming light penetrates the transparent front electrode 22 and forms electron-hole pairs in the n-silicon base wafer. These pairs diffuse to the discrete junction elements on the back silicon surface facing the electron beam, and discharge the associated junction elements. The diffusion of minority carriers from the front to the back surface demands a very thin wafer for two reasons; (1) some spreading will be associated with the diffusion process, and this must be kept to a minimum; (2) the minority carriers must not have to travel so far that they "die" before reaching the back junction elements. The first of these reasons demands that the wafer thickness be less than the desired resolution, so that resolution is not degraded by the lateral diffusion. This requires a wafer thickness of less than 0.0025 in., which is possible with polishing and etching techniques. The second requirement is that the diffusion length must be greater than the wafer thickness. For one ohm-cm. material, $\tau_p\cong10^{-6}$ sec. and $L_p=(D_p\tau_p)^{1/2}\cong0.002$ in. Diffusion length considerations also require wafer thicknesses of less than 2 mils.

It is noted from FIG. 1 that the electron beam scans areas of the silicon target between the junction elements as well as the junction elements themselves. In a typical vidicon electron collection system, these nonjunction areas would contribute a large undesirable signal. There are two means for eliminating a signal from such nonjunction areas: (1) coat the nonjunction areas with an evaporated dielectric layer; (2) use a planar oxide construction technique. The first remedy requires a somewhat difficult mask alignment procedure during construction, but can be used with mesa type construction. The second remedy is a natural result of a mosaic array construction process using planar oxide technology. In this case, the n-silicon base wafer would have a thick oxide formed on one surface, holes with the desired resolution would be photoetched through the oxide, and a p-type dopant would be diffused through the exposed areas. No leakage signal would appear when the beam struck nonjunction areas, as long as the oxide layer had a resistivity above about $10^{12}$ ohm-cm.

The discussion of charge storage in reverse biased p-n junctions has been based on either $n^+p$ or $p^+n$ structures. However, it is important to note that considerations of the electron beam scanning system require an n-type base and a p-type inversion layer in order to operate in the typical vidicon mode (i.e., with the energy of the readout beam less than the first crossover potential with respect to the surface of the photosensitive layer). This is necessary because the electron beam charges the back junction surface to a negative potential; in order to reverse bias the junction, the p-side must become negative. Thus the p-side must face the incoming electron beam, and the n-type base must face the incident light. In a system using a positively charged beam of particles the base would be p-type and the mosaic array would be of n-type material.

It has been shown above that relatively small bandgap, low resistivity semiconductors (such as silicon and germanium) can be used as charge storage type vidicon targets at or near room temperature by employing specially designed p-n junction mosaic arrays. A rather surprising result of the analysis is that low resistivity doped base material must be employed in the p-n photojunction vidicon, in contrast to the usual requirement for extremely high resistivity in a bulk photoconductor vidicon.

Any semiconductors that are photosensitive to the extent that imagewise exposure by actinic radiation (e.g. light, X-rays, infrared radiation, gamma rays, particle radiation, etc.) of a charged target of such semiconductor material, constructed according to the present invention, will produce a corresponding imagewise change in the surface charge characteristics thereof, which change is sufficient to allow the scanning readout electron beam to distinguish between exposed and nonexposed areas thereof, are useful in the present invention and are herein referred to as photosensitive semiconductors.

The image transducing system of the invention is not limited in application to use in vidicon camera tubes. The conversion of an optical image into an electrostatic image by this invention can be employed to produce a visible print according to known electrographic methods. For example, the target 12 can be corona charged, image-exposed to produce an electrostatic image, and this electrostatic image can be transferred to an insulating sheet where it can be xerographically developed to produce a print corresponding to said light image. Further, it is noted that the p-layer and the n-layer can be of different semiconductor materials. The mosaic array of p-n junctions can be used as a photosensitive, charge storing grid in which case both layers are essentially formed as mosaic arrays.

What is claimed is:

1. In a vidicon camera tube including an evacuated envelope, a charge-storing photosensitive target adjacent a transparent end of said envelope, which target is adapted for imagewise exposure to actinic radiation, an electron beam forming and scanning means adjacent the other end of said envelope for use in scanning said target, and an electrode mesh mounted adjacent the inside surface of said target for fixing the potential to which said surface is charged by said beam, the improvement wherein:

said target comprises a semiconductive material containing a p-n junction between a front n-type layer and a rear p-type layer which rear layer faces said beam and which comprises an array of discrete, substantially uniformly and insulatingly spaced-apart areas of substantially uniform size, said p-n junction having a dark charge-storing time greater than the scan time of said beam, a front transparent electrode in contact with the front surface of said n-type layer, and means for maintaining said transparent electrode at a positive potential whereby said p-n junction is reverse biased.

2. The apparatus according to claim 1 in which said semiconductive material is silicon having a resistivity between 0.01 and 0.1 ohm-cm.

3. The apparatus according to claim 1 in which said semiconductive material has a resistivity $\rho$ in which:

$$\left(\frac{1}{F_0^1}\right)^2\left(\frac{2V_i}{\epsilon\epsilon_0\mu_n}\right)<\rho<\left(\frac{30}{i_R}\right)^2\cdot\left(\frac{\epsilon\epsilon_0V_i}{2\mu_n}\right)$$

wherein $F_0^i$=Zener breakdown electric field strength,
$V_i$=target potential (up to 10 v.),
$\mu_n$=electron mobility of the n-type layer,
$\epsilon$=dielectric constant of n-type layer,
$\epsilon_0$=dielectric constant of p-type layer,
$i_R$=reverse bias saturation current.

4. A vidicon camera tube comprising a semiconductor target member having first and second sides, at least the first of which is of n-type conductivity and adapted to receive light images, a plurality of discrete p-type regions in said second side of said semiconductor target member, and electron beam means for scanning said second side of semiconductor target member, said semiconductor target member having a resistivity $\rho$ wherein:

$$\left(\frac{1}{F_0^i}\right)^2\left(\frac{2V_i}{\epsilon\epsilon_0\mu_n}\right)<\rho<\left(\frac{30}{i_R}\right)^2\cdot\left(\frac{\epsilon\epsilon_0V_i}{2\mu_n}\right)$$

wherein $F_0^i$=Zener breakdown electric field strength,
$V_i$=target potential (up to 10 v.),
$\mu_n$=electron mobility of said n-type region,
$\epsilon$=dielectric constant of said n-type region,
$\epsilon_0$=dielectric constant of p-type regions,
$i_R$=reverse bias saturation current.

5. A storage tube of the type employing a charge-storing, photosensitive target and electron beam forming and scanning means for said target, wherein said target comprises a semiconductor material containing a p-n junction between a front n-type layer and a rear p-type layer which rear layer faces said beam and which comprises an array of discrete, substantially uniformly and insulatingly spaced-apart areas of substantially equal size, and including means for reverse biasing said p-n junction, said semiconductive material having a resistivity $\rho$ wherein:

$$\left(\frac{1}{F_0^i}\right)^2\left(\frac{2V_i}{\epsilon\epsilon_0\mu_n}\right)<\rho<\left(\frac{30}{i_R}\right)^2\cdot\left(\frac{\epsilon\epsilon_0V_i}{2\mu_n}\right)$$

wherein $F_0^i$=Zener breakdown electric field strength,
$V_i$=target potential (up to 10 v.),
$\mu_n$=electron mobility of the n-type layer,
$\epsilon$=dielectric constant of n-type layer,
$\epsilon_0$=dielectric constant of p-type layer,
$i_R$=reverse bias saturation current.

6. The apparatus according to claim 5 in which said semiconductive material is silicon having a resistivity between 0.01 and 0.1 ohm-cm.

7. The method of producing a vidicon camera tube target element comprising:
providing a first layer comprising an n-type single crystal silicon wafer having a resistivity between 0.01 and 0.1 ohm-cm.,
growing an oxide layer over one surface of said wafer,
forming an array of holes in said oxide layer, said array corresponding to a resolution of about 500 lines/inch,
thermally diffusing a p-type impurity through said holes to form an array of discrete p-n junctions, and
providing a transparent conductive electrode in contact with the other surface of said wafer.

8. A storage tube comprising:
an evacuated envelope,
an electron beam forming and scanning means adjacent one end of said envelope,
a charge storing, photosensitive target element adjacent the other end of said envelope,
an electrode mesh mounted adjacent the inside surface of said target element for use in fixing the potential to which said inside surface will be charged by said beam,
said target element comprising:
a semiconductive material containing a p-n junction between a front n-type layer and a rear p-type layer which rear layer faces said beam and which comprises an array of discrete, substantially uniformly and insulatingly spaced-apart areas of substantially uniform size,
a front transparent electrode in contact with the front surface of said n-type layer,
means for maintaining said transparent electrode at a positive potential whereby said p-n junction is reverse biased, and
said p-n junction having a dark charge storing time greater than the scan time of said beam.

9. The apparatus according to claim 8 in which said semiconductive material is silicon having a resistivity between 0.01 and 0.1 ohm-cm.

10. The apparatus according to claim 8 in which said semiconductive material has a resistivity $\rho$ in which:

$$\left(\frac{1}{F_0{}^i}\right)^2\left(\frac{2V_i}{\epsilon\epsilon_0\mu_n}\right)<\rho<\left(\frac{30}{i_R}\right)^2\cdot\left(\frac{\epsilon\epsilon_0V_i}{2\mu_n}\right)$$

wherein
$F_0{}^i$=Zener breakdown electric field strength,
$V_i$=target potential (up to 10 v.),
$\mu_n$=electron mobility of the n-type layer,
$\epsilon$=dielectric constant of n-type layer,
$\epsilon_0$=dielectric constant of p-type layer,
$i_R$=reverse bias saturation current.

11. A vidicon camera tube target element comprising:
a first layer of photosensitive, semiconductive material which has been doped to make it an n-type semiconductor,
a second layer of said material which has been doped to make it a p-type semiconductor in contact with said first layer whereby a p-n junction is formed,
said second layer being in the form of an array of discrete, substantially uniformly and insulatingly spaced-apart areas of substantially equal size,
said semiconductive material having a resistivity $\rho$ wherein:

$$\left(\frac{1}{F_0{}^i}\right)^2\left(\frac{2V_i}{\epsilon\epsilon_0\mu_n}\right)<\rho<\left(\frac{30}{i_R}\right)^2\cdot\left(\frac{\epsilon\epsilon_0V_i}{2\mu_n}\right)$$

wherein:
$F_0{}^i$=Zener breakdown electric field strength,
$V_i$=target potential (up to 10 v.),
$\mu_n$=electron mobility of the n-type layer,
$\epsilon$=dielectric constant of n-type layer,
$\epsilon_0$=dielectric constant of p-type layer,
$i_R$=reverse bias saturation current.

12. A vidicon camera tube target element comprising:
a first layer of n-type silicon having a resistivity between 0.01 and 0.1 ohm-cm., and
a second layer of p-type silicon having a resistivity between 0.01 and 0.1 ohm-cm. in contact with one surface of said first layer and comprising an array of equi-spaced, insulatingly separated areas of equal size whereby said target element comprises an array of discrete p-n- junctions in silicon.

13. A vidicon camera tube comprising:
(a) a semiconductor target member having a resistivity between 0.01 and 0.1 ohm-cm. and first and second sides, at least the first of which of of n-type conductivity and adapted for exposure to light images;
(b) a plurality of junction diodes on said second side of said semiconductor target member;
(c) and electron beam means for scanning said second side of said semiconductor target member.

14. The invention according to claim 13 wherein said junction diodes are of the p-n junction type.

15. The invention according to claim 13 wherein said junction diodes are of the metal-semiconductor type.

16. The method of employing a relatively narrow bandgap, relatively low resistivity, photosensitive silicon semiconductor having a resistivity between 0.01 and 0.1 ohm-cm. as a charge-storing image transducing element comprising:
forming a mosaic array of insulatingly separated n-p junctions in said semiconductor,
charging one surface of said array,
reverse biasing said junctions,
exposing said array to actinic radiation, and
reading-out the information stored on said array as a result of said exposing step in a time period less than the dark charge-storing time of said junctions.

17. The method according to claim 16 including employing said array as a vidicon target, and said reading-out step comprising scanning said array with the vidicon read-out electron scanning beam having an scan time of about 1/30 of a second, whereby the dark charge-storing time of said junctions is greater than said scan time.

18. A vidicon camera tube comprising:
(a) a semiconductor target member having a resistivity between 0.01 and 0.1 ohm-cm. and first and second sides, at least the first of which is of n-type conductivity and adapted to receive light images;
(b) means forming a plurality of discrete junctions on said second side of said semiconductor target member;
(c) and electron beam means for scanning said second side of said semiconductor target member.

19. The invention according to claim 18 wherein said discrete junctions are of the p-n junction type.

20. The invention according to claim 18 wherein said discrete junctions are of the metal-semiconductor type.

21. The invention according to claim 18 wherein said means forming said plurality of discrete junctions comprises a plurality of discrete p-type regions in said semiconductor target member.

22. The invention according to claim 18 including means for reverse biasing said junctions.

References Cited

UNITED STATES PATENTS

| | | | |
|---|---|---|---|
| 3,011,089 | 11/1961 | Reynolds | 313—65 X |
| 3,289,024 | 11/1966 | De Haan et al. | 313—65 |
| 3,322,955 | 5/1967 | Desvignes | 250—211 X |

RODNEY D. BENNETT, *Primary Examiner.*

D. C. KAUFMAN, *Assistant Examiner.*

U.S. Cl. X.R.

313—65; 315—12

UNITED STATES PATENT OFFICE
CERTIFICATE OF CORRECTION

Patent No. 3,423,623 Dated January 21, 1969

Inventor(s) Paul H. Wendland

It is certified that error appears in the above-identified patent and that said Letters Patent are hereby corrected as shown below:

Column 5, line 12, Equation 1 "$dq/dt-i_R$" should read -- $dq/dt=i_R$ --. Column 6, line 31, Equation 80 should appear as shown below:

$$F_o = (2V_i/\varepsilon\varepsilon_o\rho\mu_n)^{1/2}$$

Column 8, Table 1:

"(A) 1,000 p-cm p-type silicon" should read
-- (A) 1,000 -cm p-type silicon --;
"(B) 0.1 p-cm p-type silicon" should read
-- (B) 0.1 Ω-cm p-type silicon --.

Signed and sealed this 10th day of August 1971.

(SEAL)
Attest:

EDWARD M.FLETCHER,JR.
Attesting Officer

WILLIAM E. SCHUYLER, JR.
Commissioner of Patents